United States Patent [19]

Ishikawa et al.

[11] Patent Number: 5,610,911
[45] Date of Patent: Mar. 11, 1997

[54] METHOD AND DEVICE FOR CHANNEL SELECTION

[75] Inventors: Hajime Ishikawa; Tetsuyuki Suzaki, both of Tokyo, Japan

[73] Assignee: NEC Corporation, Japan

[21] Appl. No.: 314,047

[22] Filed: Sep. 28, 1994

[30] Foreign Application Priority Data

Sep. 28, 1993 [JP] Japan .................................. 5-240980

[51] Int. Cl.⁶ ........................................................ H04J 3/06
[52] U.S. Cl. .................... 370/503; 370/516; 370/535; 375/366; 375/368; 340/825.03; 359/135
[58] Field of Search ................................ 370/55, 100.1, 370/105, 105.1, 105.2, 105.4, 106, 112, 85.15; 375/106, 114, 116, 362, 365, 366, 368, 371; 359/135; 340/825.03, 825.2

[56] References Cited

U.S. PATENT DOCUMENTS

| | | | |
|---|---|---|---|
| 3,909,541 | 9/1975 | Bobilin | 370/105.1 |
| 4,213,011 | 7/1980 | Hoelzl et al. | 370/105.4 |
| 4,276,642 | 6/1981 | Siglow et al. | 370/105 |
| 4,694,473 | 9/1987 | Etoh | 370/106 |
| 4,920,535 | 4/1990 | Watanabe et al. | 370/105.4 |
| 5,119,373 | 6/1992 | Fredricsson et al. | 370/85.15 |
| 5,229,998 | 7/1993 | Weisser | 370/112 |

*Primary Examiner*—Hassan Kizou
*Attorney, Agent, or Firm*—Ostrolenk, Faber, Gerb & Soffen, LLP

[57] ABSTRACT

The present invention provides a method and device for channel selection for setting at least one channel among N channels as a reference channel, detecting temporal location of the reference channel in a reception side, selecting an arbitrary channel using a relative time difference between the detected temporal location of the reference channel and that of the channel to be selected.

17 Claims, 13 Drawing Sheets

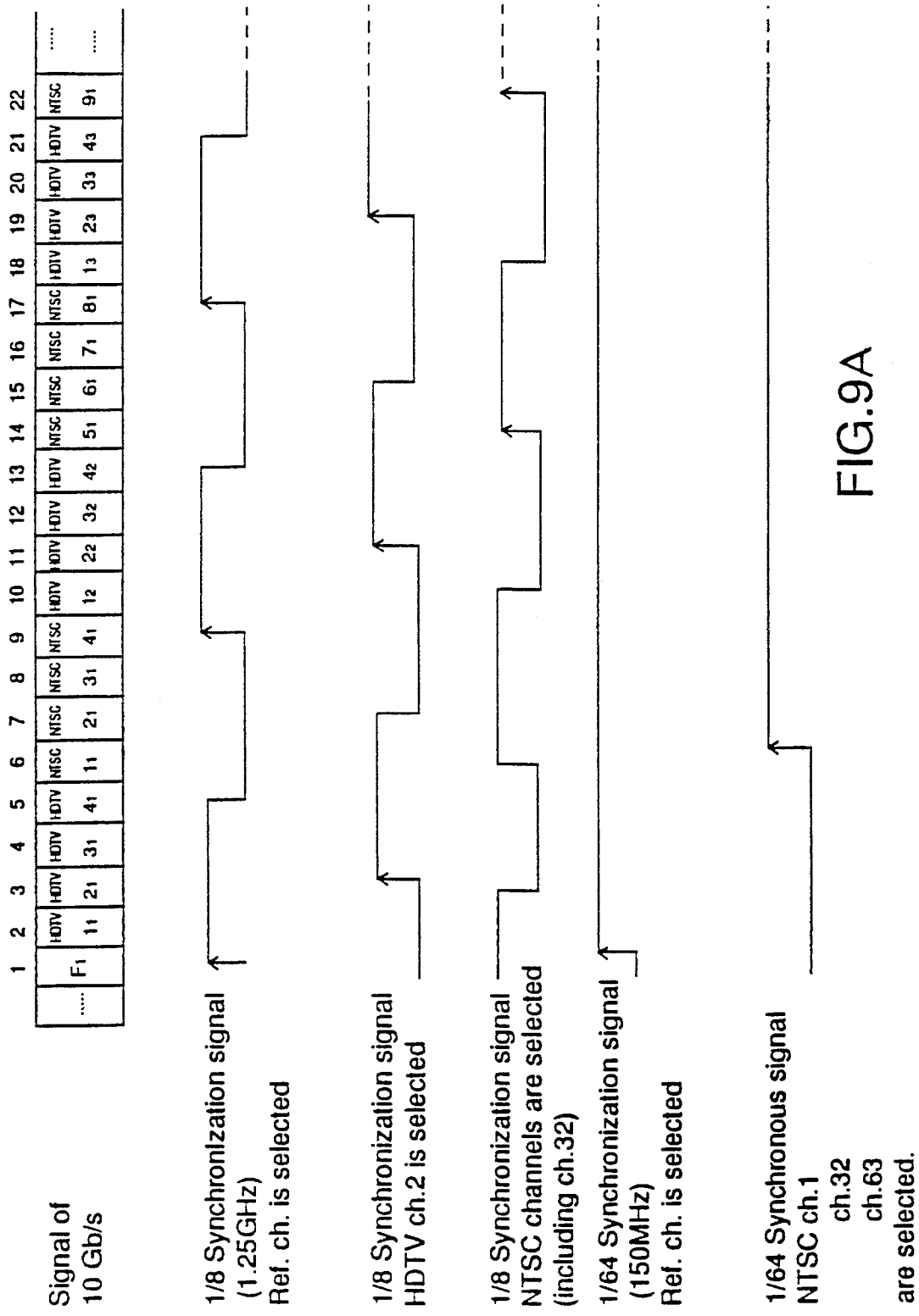

Fig. 12a PRIOR ART
Fig. 12b PRIOR ART
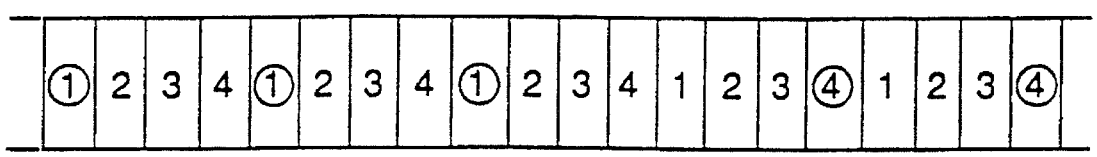
Fig. 12c PRIOR ART
Fig. 13a PRIOR ART
Fig. 13b PRIOR ART
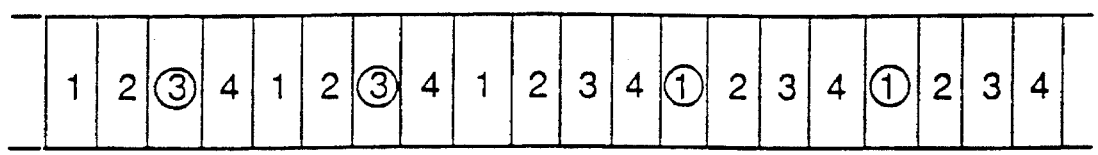
Fig. 13c PRIOR ART

METHOD AND DEVICE FOR CHANNEL SELECTION

BACKGROUND OF THE INVENTION

The present invention is used for high speed data transmission, and especially for optical fiber data transmission systems that multiplex and distribute high speed data.

Here, the prior art of channel selection method described in Japanese Patent Laid-Open No.42929 (1991) is explained.

FIG. 10 is a block diagram showing the channel selection method described in the above-mentioned Published Unexamined Patent Application.

In this figure, 101 is a transmitter.

102 to 105 are data transmission circuits for receiving data from data input terminals D1 to D4 respectively and outputting the data at respective timing.

106 is a bit multiplexing circuit for time division multiplexing data output from the data transmission circuits 102 to 105 and outputting a serial transmission data to a reception side.

107 is a first frequency divider for frequency dividing a transmission clock into ¼ and supplying pulses of which timing are different each other to the data transmission circuits 102 to 105.

108 is a clock generation circuit for supplying the transmission clock to the bit multiplexing circuit 106, the frequency divider 107 and the reception side.

109 is a channel information addition circuit for detecting channel information input from a channel information input terminal CH1 and supplying this channel information to the bit multiplexing circuit 106, the frequency divider 107 and the clock generation circuit 108. The channel information consists of channel numbers and information on number of all channels.

110 is a receiver.

111 is a data reception circuit for selecting channels in the serial transmission data and extracting data of a specified channel.

112 is a clock reception circuit for receiving the transmission clock.

113 is a gate circuit for opening and closing at every one clock based on the channel information and channel selection information input into a channel selection input terminal CHS and controlling the transmission clock.

114 is a second frequency divider for frequency dividing the clock from the gate circuit 113 into ¼.

115 is a channel information detection circuit for detecting channel information from among reception data.

OUT is an output terminal of reception data.

Next, operation of the above-mentioned channel selection method is explained.

First, the clock generation circuit 108 generates a clock signal at transmission speed of the system trunk line within the transmitter 101.

The frequency divider 107 frequency divides the clock signal into ¼ and supplies the divided clock signals to the data transmission circuits 102 to 105.

The data transmission circuits 102 to 105 output bit data at different timing in parallel.

The bit multiplexing circuit 106 time division multiplexes outputs from the data transmission circuits 102 to 105 to make them a serial data.

On the other hand, the channel information addition circuit 109 receives channel information from the channel information input terminal CH1 and gives channel information to the bit multiplexing circuit 106 via the clock generation circuit 108 and the frequency divider 107.

Then, the bit multiplexing circuit 106 adds channel information on the above-mentioned serial data to make a serial transmission data and transmits the serial transmission data to the receiver 110 in synchronizing with the transmission clock.

The data reception circuit 111 in the receiver 110 extracts and receives data of the specified channel from among the serial transmission data transmitted in synchronizing with the above-mentioned transmission clock.

The synchronization signal used for this extraction operation is the transmission clock, which has been received in the clock reception circuit 112, divided into ¼ in the frequency divider 114 as shown in FIG. 11.

Where, in FIG. 11, A is transmission side, B is reception side, a is a serial transmission data in which parallel data of channels 1 to 4 are multiplexed, b is a transmission clock and c is a transmission clock that is frequency divided into ¼.

Next, channel switching operation is explained.

FIG. 12 and FIG. 13 are figures to explain channel switching operation.

Where, in these figures, a is a transmission clock, b is a frequency division output output from the frequency divider 114 and c is a serial transmission data.

First of all, for carrying out channel switching, currently receiving channel number and number of all channels are recognized by detecting channel information from a current channel in the channel information detection circuit 115.

Here, the case of switching channel from channel 1 to channel 4 is considered as shown in FIG. 12.

In this case, the gate circuit 113 firstly prohibits 3 clocks (=4 clocks–1 clock) among 4 clocks of the transmission clocks and outputs the result to the frequency divider 114. Thus, channel 1 is switched to channel 4.

In FIG. 12, the three clocks, which are drawn by dotted lines on the frequency division output b, show the prohibited clocks, numbers on the serial transmission data c are data according to channel numbers and each channel number marked by a circle shows data of the channel number that is received.

FIG. 13 shows the case of switching channel from channel 3 to channel 1.

In this case, the gate circuit 113 firstly prohibits 2 clocks (=4 clocks–(3 clocks–1 clock)) among 4 clocks of the transmission clocks and outputs the result to the frequency divider 114. Thus, channel 3 is switched to channel 1.

Like this, in the prior art, the transmission side must add all channel information onto a transmission data and the reception side must extract channel information from an arbitrary channel and control channel selection.

By this reason, the prior art has a problem that the circuit becomes complicated and the receiver becomes large for signal processing. In addition, if signals of which transmission speed are not same are mixed, the signal processing becomes more complicated.

SUMMARY OF THE INVENTION

It is the first object of the present invention to provide an art for channel selection enabling to easily select a channel from among a plurality of channels.

It is the second object of the present invention to simplify transmission and receiver selecting and receiving a channel from among a plurality of channels in its structure and miniaturizing its size.

It is the third object of the present invention to provide a art for channel selection enabling to easily select a channel from among a plurality of channels of different transmission speed.

The objects of the present invention are achieved by a method for channel selection comprising: (a) step of setting at least one channel among N channels as a reference channel, generating a transmission signal by time division multiplexing discrimination information for discriminating the reference channel with data of other channels and transmitting the transmission signal; and (b) step of receiving the transmission signal, detecting temporal location of the reference channel in the N channels based on the discrimination information included in the transmission signal and selecting an arbitrary channel based on a relative time difference between the temporal location of reference channel detected and temporal location of the arbitrary channel in the N channels.

In the channel selection art of the present invention, at least one channel among N channels is set as a reference channel and this reference channel is selected after transmitted. The present invention features that temporal location of the reference channel in a time division multiplexed data is detected and an arbitrary channel in the N channels is selected.

These and other objects, features and advantages of the invention will become more apparent upon a reading of the following detailed description and drawings.

BRIEF DESCRIPTION OF THE DRAWINGS

FIG. 12 is a figure for explaining a prior art.

FIG. 13 is a figure for explaining a prior art.

DESCRIPTION OF THE PREFERRED EMBODIMENTS

First of all, the first embodiment of the present invention is explained.

The first embodiment is a case that (N–1) channels and a reference channel are supposed and all of these channels are time division multiplexed in the same transmission speed.

Figure 1:
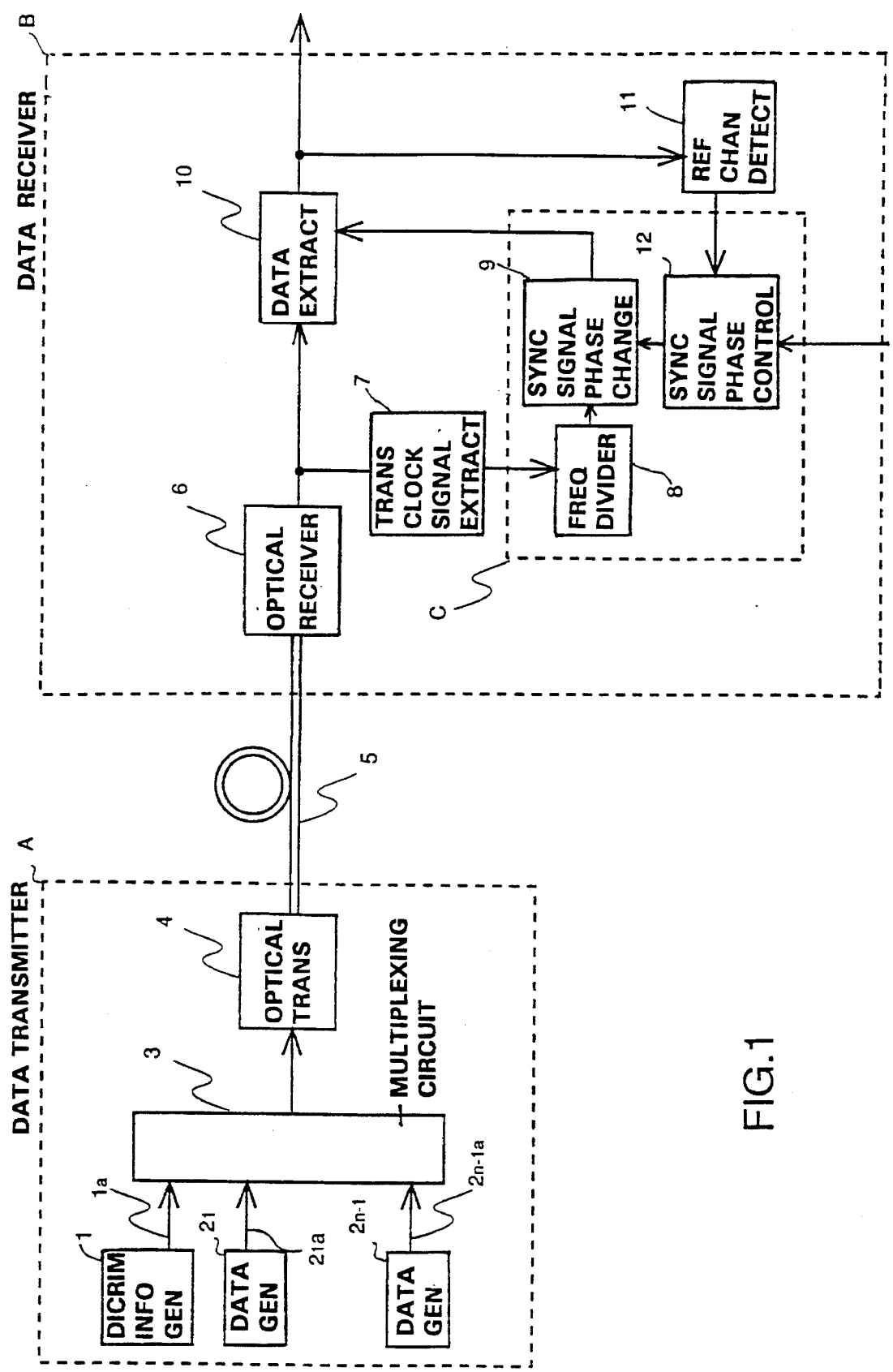
FIG. 1 is a block diagram of the first embodiment of the present invention.

FIG. 1 is a block diagram of the first embodiment.

In this figure, A is a data transmitter, B is a data receiver and c is a synchronization signal phase control means.

1 is a discrimination information generator for generating discrimination information $1a$. This discrimination information $1a$ is a fixed cyclic pulse string, for example, 101010 . . . . The channel having this discrimination information generator 1 is a reference channel.

$2_1$ to $2_{n-1}$ are (N–1) data generators for generating data $2_1a$ to $2_{n-1}a$, respectively.

3 is a time division multiplexing circuit for time division multiplexing the discrimination information $1a$ and data $2_1a$ to $2_{n-2}a$.

4 is an optical transmitter for converting output of the time division multiplexing circuit 3 to light and transmits it via an optical fiber 5.

6 is an optical receiver for converting a light signal transmitted to electric information.

7 is a transmission clock signal extraction circuit for extracting a transmission clock signal from the electric information.

8 is a frequency divider for frequency dividing the transmission clock signal into 1/N and generating synchronization signals according to each transmission speed of discrimination information $1a$ and data $2_1a$ to $2_{n-1}a$.

9 is a synchronization signal phase changing circuit for changing phase of the synchronization signal according to an instruction from a synchronization signal phase control circuit 12 described later.

10 is a data extraction circuit for selecting a channel synchronized with phase of a synchronization signal from the synchronization signal phase changing circuit 9 and extracting data of the channel.

11 is a reference channel detection circuit for monitoring each output of the channel output from the data extraction circuit 10 and detecting a reference channel by discriminating a signal string of discrimination information.

12 is a synchronization signal phase control circuit for outputting a control signal that changes phase of the synchronization signal one time slot each. In addition, it stores the phase of synchronization signal synchronized with the reference channel based on a detection signal from the reference channel detection circuit 11.

Next, operation of the first embodiment configured as above is explained.

Figure 2:
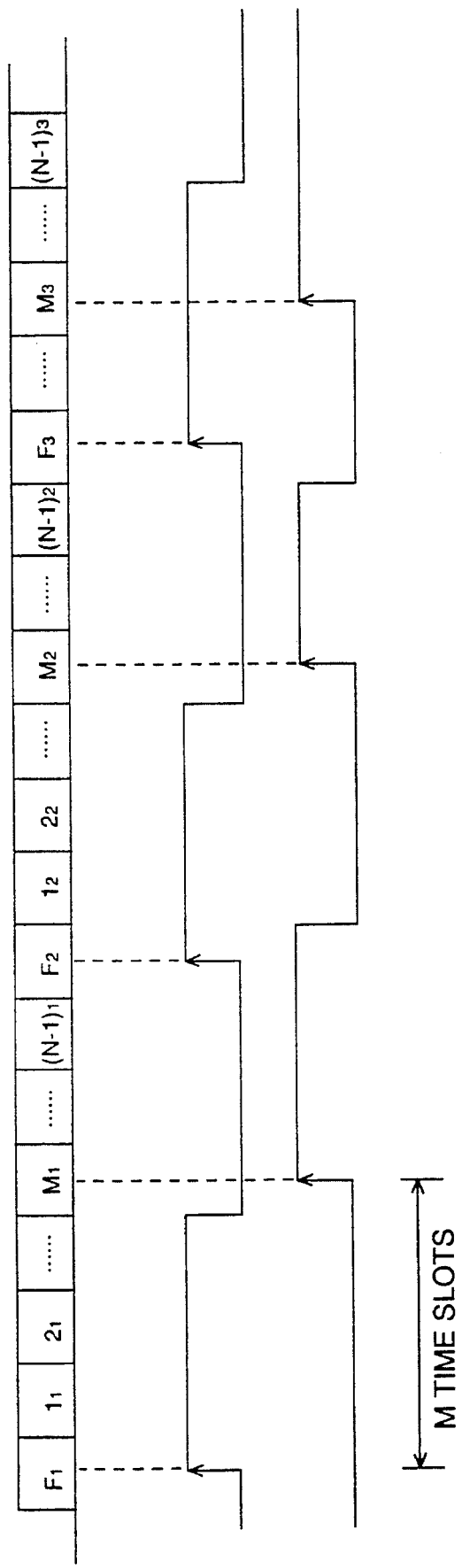
FIG. 2 is a timing chart of the first embodiment of the present invention.

FIG. 2 is a timing chart for explaining the operation of the first embodiment.

First, in the data transmitter A, the discrimination information $1a$ and the data $2_1a$ to $2_{n-1}a$ are time division multiplexed as shown in FIG. 2, a transmission signal is transmitted. Where, in FIG. 2, F is a reference channel, M is an arbitrary channel, $F_k$ is k-th bit of the reference channel F and $M_k$ is k-th bit of the channel M. Also, in case of time division multiplexing, $M_k$ always locates on the M-th time slot behind from $F_k$.

In the data receiver B, the optical receiver 6 converts the transmission signal to electric information.

At this time, that is, when the data receiver B starts up, the synchronization signal phase control circuit 12 outputs a control signal changing phase of the synchronization signal one time slot each to the synchronization signal phase changing circuit 9 and changes the phase of synchronization signal.

Then, the reference channel detection circuit 11 monitors data of each channel extracted in the data extraction circuit 10, detects the reference channel from among the data by finding out a unique signal string of discrimination information and outputs a detection signal to the synchronization signal phase control circuit 12.

Then, the synchronization signal phase control circuit 12 stores the phase synchronized with the reference channel, as shown in FIG. 2, as a reference channel and fixes phase of the synchronization signal output from the synchronization signal phase changing circuit 9 on the reference phase.

Next, it is supposed that the synchronization signal phase control circuit 12 is requested to select an arbitrary channel, for example channel M.

Here, the synchronization signal phase control circuit 12 calculates a time difference between the reference channel F and the channel M, in other words, it counts number of time slots from the reference channel F to the channel M.

Considering the case shown in FIG. 2, the number of time slots from the reference channel F to the channel M is M.

Therefore, the synchronization signal phase control circuit 12 outputs a control signal to shift the reference phase M time slots to the synchronization signal phase changing circuit 9 as shown in FIG. 2.

Then, the synchronization signal phase changing circuit 9 shifts the phase of the synchronization signal (reference phase) M time slots to the channel M and outputs a synchronization signal synchronized with the channel M to the data extraction circuit 10.

Continuously, the data extraction circuit 10 extracts and outputs data of the channel M from among electric information based on the synchronization signal synchronized with the channel M.

Comparing with a prior receiver, the receiver by this embodiment enables to minimize receiver size to about 1/20 and reduce its cost to about 1/10.

Next, the second embodiment is explained.

The second embodiment is the same as the first embodiment except for the synchronization signal phase control means c in the first embodiment.

Figure 3:
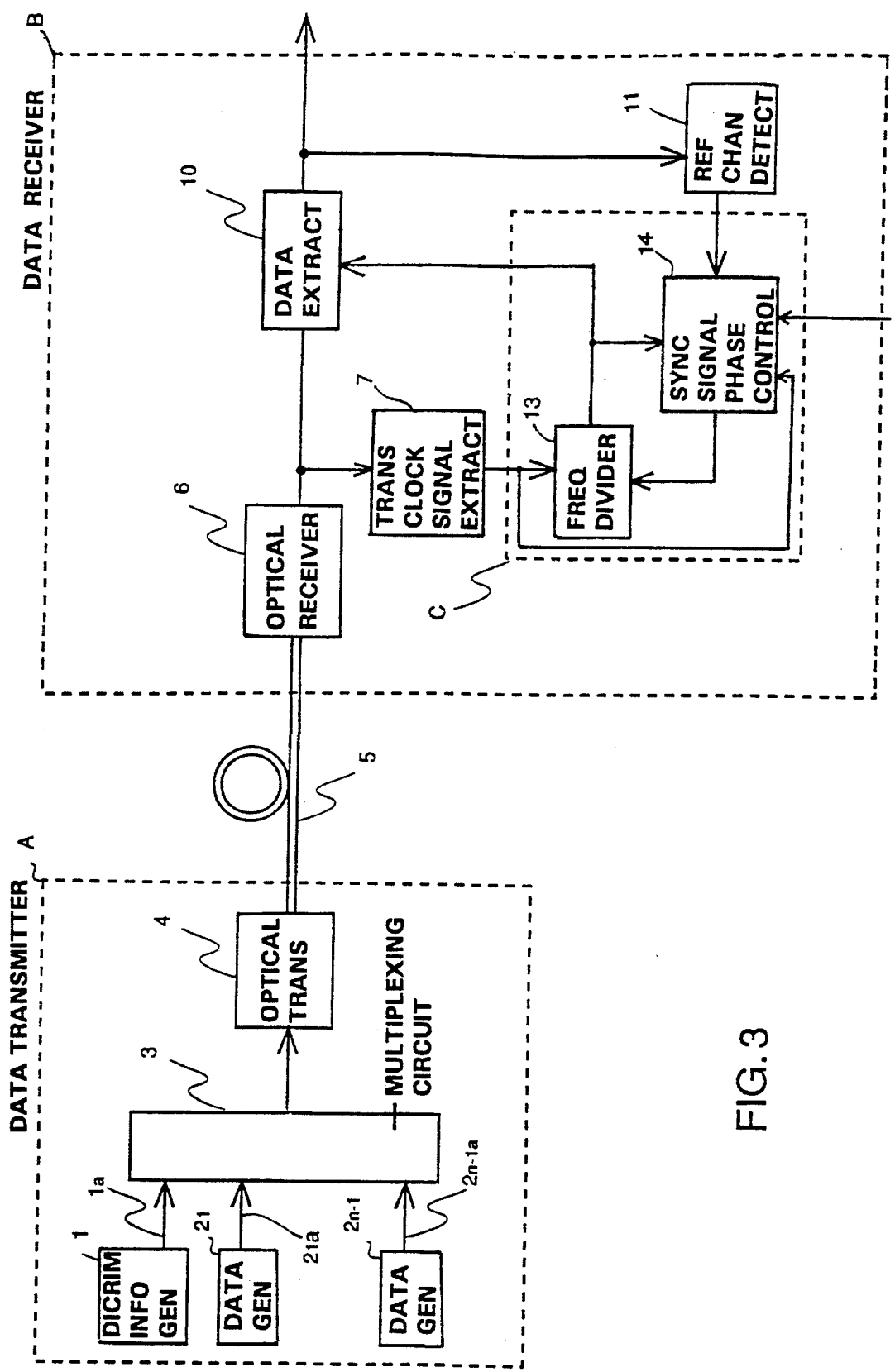
FIG. 3 is a block diagram of the second embodiment of the present invention.

FIG. 3 is a block diagram of the second embodiment. Where, the component having the same configuration as that of the first embodiment is given the same code number.

13 is a second frequency divider for frequency dividing a transmission clock signal into 1/N and generating a synchronization signal according to each transmission speed of discrimination information $1a$ and data $2_1a$ to $2_{n-1}a$. Then, it resets frequency division operation at input timing of the reset signal output from the synchronization signal phase control circuit 14 described later, and generates a new cyclic synchronization signal.

14 is a second synchronization signal phase control circuit for outputting a reset signal synchronized with a transmission clock signal, that is, each time slot.

Next, operation of the second embodiment is explained. Where, the operation to extraction of a transmission clock signal is the same as that of the first embodiment, so explanation for it is omitted.

First, while delaying the reset signal one time slot, the synchronization signal phase control circuit 14 outputs the delayed reset signal when the receiver starts up.

Then, the frequency divider 13 outputs a synchronization signal of which phase is shifted one time slot from the synchronization signal before being reset. It continues this operation until detection of a reference channel. When the reference channel is detected, the synchronization signal phase control circuit 14 stores the phase at this time as a reference phase and fixes the phase of the synchronization signal output from the frequency divider 13 on the reference phase.

Here, it is supposed that the synchronization signal phase control circuit 14 is requested to select an arbitrary channel, for example, channel M.

The synchronization signal phase control circuit 14 calculates a time difference between the reference channel F and the channel M, in other words, it counts number of a time slots from the reference channel F to the channel M.

Considering the case shown in FIG. 2, the number of time slots from the reference channel F to the channel M is M. Therefore, the synchronization signal phase control circuit 14 outputs a reset signal at the timing of M-th time slot from the reference channel.

Then, the frequency divider 13 starts frequency dividing in a new phase and outputs a synchronization signal synchronized with the channel M to the data extraction circuit 10 as shown in FIG. 2.

Continuously, the data extraction circuit 10 extracts and outputs data of the channel M from among electric information based on the synchronization signal synchronized with the channel M.

Next, the third embodiment is explained.

The third embodiment is the same as the first embodiment except for the synchronization signal phase control means c in the first embodiment.

Figure 4:
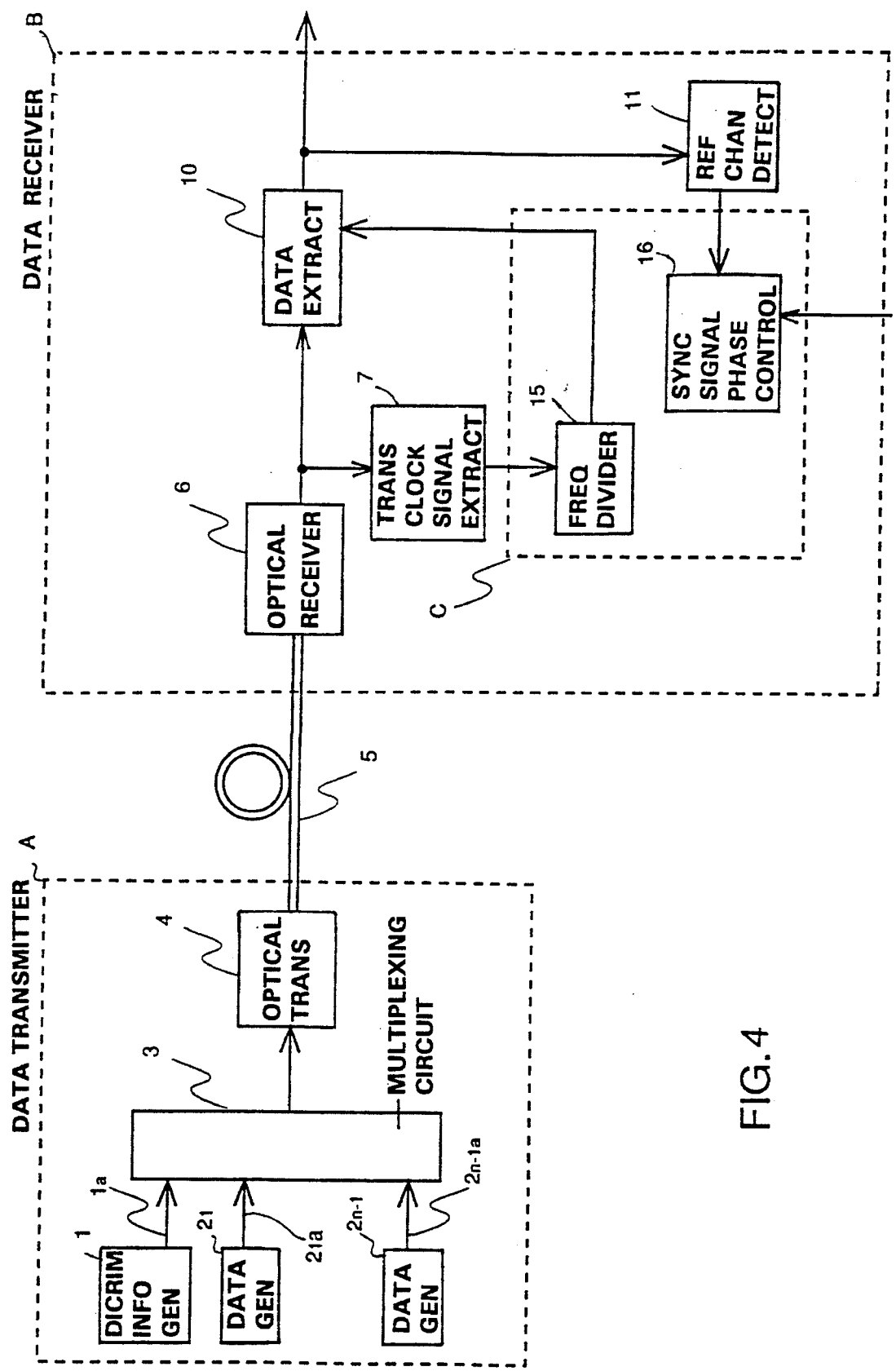
FIG. 4 is a block diagram of the third embodiment of the present invention.

FIG. 4 is a block diagram of the third embodiment. Where, the component having the same configuration as that of the first embodiment is given the same code number.

15 is a variable frequency divider that has two frequency division modes, 1/N and 1/(N+1).

Usually, it frequency divides a transmission clock signal with the frequency division mode of 1/N. However, if a control signal of the synchronization signal phase control circuit 16 described later is input, it frequency divides the transmission clock signal with the frequency division mode of 1/(N+1) for cycles instructed by the control signal and then frequency divides the transmission signal with the frequency division mode of 1/N again.

16 is a third synchronization signal phase control circuit. Receiving request for selecting an arbitrary channel, it counts number of time slots from a reference channel to the arbitrary channel and outputs a control signal instructing the number counted as the number of periods to the frequency division changing frequency divider 15.

Next, operation of the third embodiment is explained. Where, the operation to extraction of a transmission clock signal is the same as that of the first embodiment, so explanation for it is omitted.

First, while increasing the number of periods to be instructed one by one, the synchronization signal phase control circuit 16 outputs control signals until the reference channel is detected when the receiver starts up.

Then, the variable frequency divider 15 continues to output in turn synchronization signals of which phases are shifted one time slot each other.

When the reference channel detection means detects a reference channel, the synchronization signal phase control circuit 16 stores the phase at that time as a reference phase and fixes the phase of the synchronization signal output from the variable frequency divider 15 on the reference phase.

Here, it is supposed that the synchronization signal phase control circuit 16 is requested to select an arbitrary channel, for example, channel M.

The synchronization signal phase control circuit 16 calculates a time difference between the reference channel F and the channel M, in other words, it counts number of time slots from the reference channel F to the channel M.

Considering the case shown in FIG. 2, the number of time slots from the reference channel F to the channel M is M. Therefore, the synchronization signal phase control circuit 16 outputs a control signal of which number of cycles is M to the variable frequency divider 15.

The variable frequency divider 15 received the control signal changes the frequency division mode to 1/(N+1) and frequency divides the transmission signals for M cycles by this frequency division mode 1/(N+1), then switches the frequency division mode to 1/N and frequency divides the transmission signals by this frequency division mode again.

Then, the phase of the synchronization signal synchronizes with the channel M as shown in FIG. 2.

Continuously, the data extraction circuit 10 extracts and outputs data of the channel M from among electric signal based on the synchronization signal synchronized with the channel M.

Next, the fourth embodiment is explained.

Figure 5:
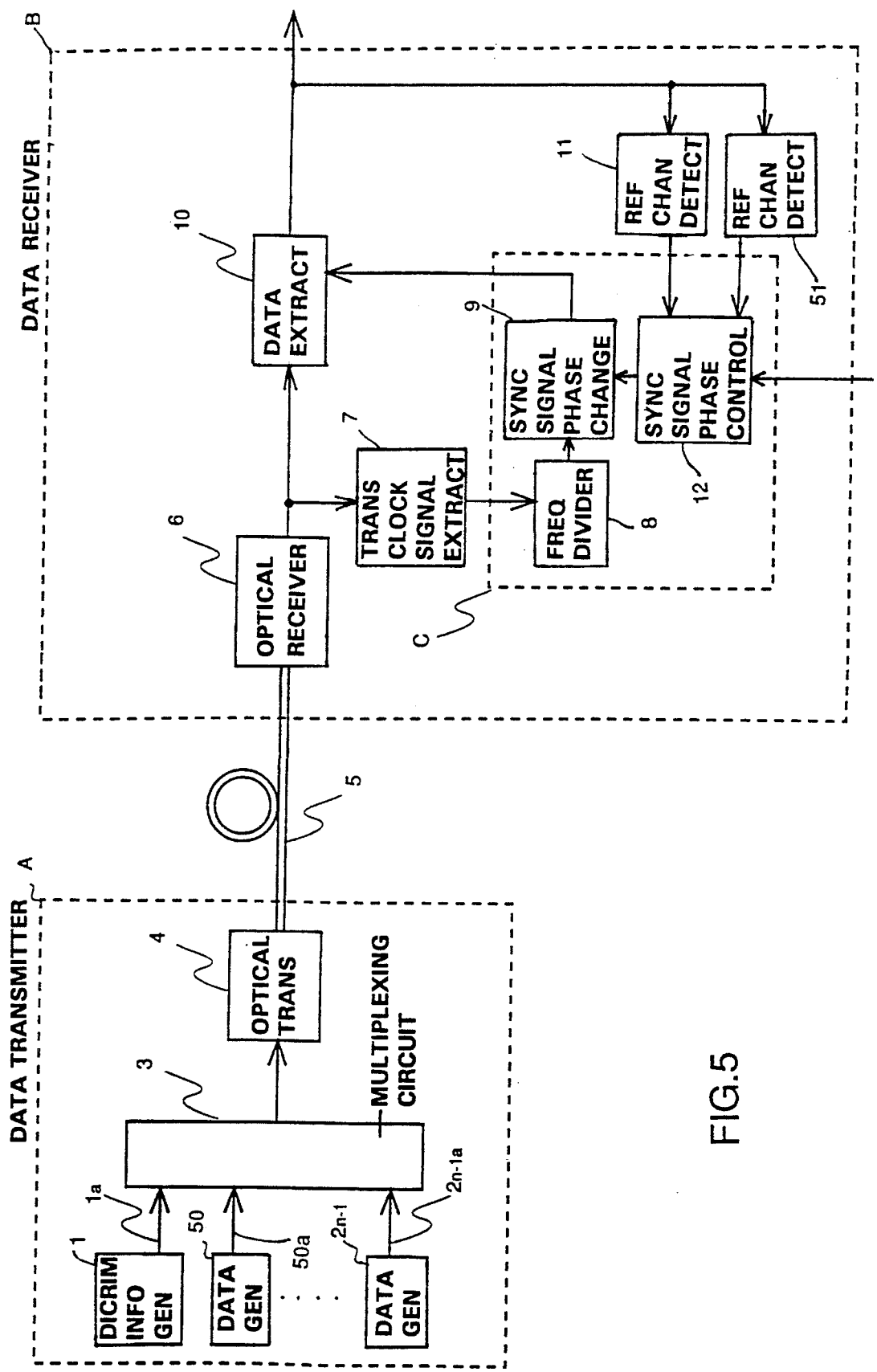
FIG. 5 is a block diagram of the fourth embodiment of the present invention.

FIG. 5 is a block diagram of the fourth embodiment. Where, the same component of which configuration is the same as that of the first embodiment is given the same code number.

In the fourth embodiment, the data transmitter A of the first embodiment is added by the second discrimination information generator 50 and the data receiver B of the first embodiment is added by the second reference channel detector 51.

The second discrimination information generator 50 generates different discrimination information from that generated by the discrimination information generator 1.

Where, in the fourth embodiment, it is supposed that the reference channel according to discrimination information generated by the discrimination information generator 1 is the first reference channel and the reference channel according to discrimination information generated by the second discrimination information generator 50 is the second reference channel.

Figure 6:
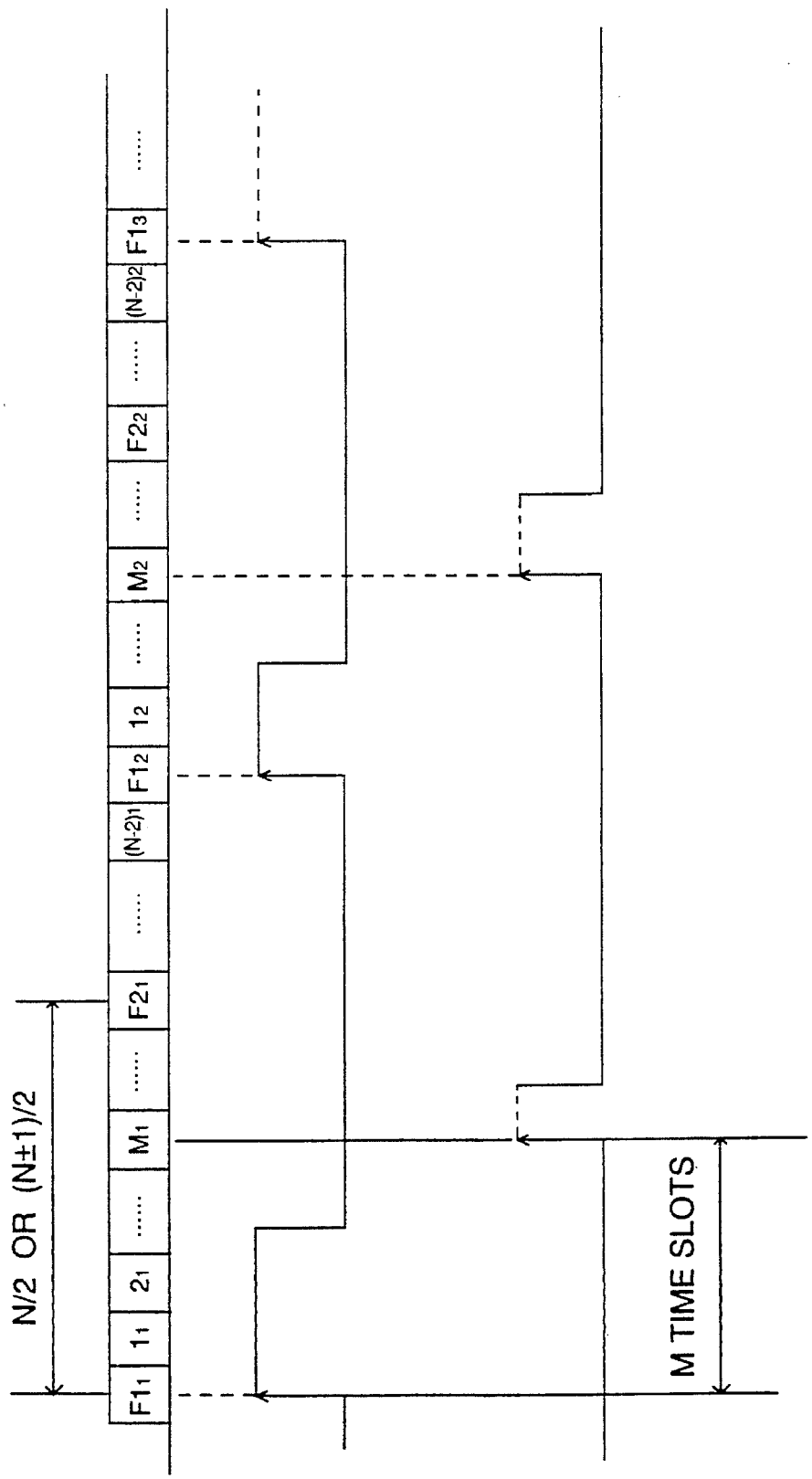
FIG. 6 is a timing chart of the fourth embodiment of the present invention.

In addition, the first reference channel and the second reference channel are time division multiplexed so that they appear at even time intervals as shown in FIG. 6, that is, the first reference channel and the second reference channel appear at every N/2 time slot if N is an even number or at every (N±1)/2 time slot if N is an odd number.

The second reference channel detector 51 discriminates the discrimination information generated by the second discrimination information generator 50 and detects the second reference channel.

Next, operation of the embodiment configured like this is explained.

In the data transmitter A, at first, the first discrimination information 1a, the second discrimination information 50a and data $2_1a$ to $2_{n-2}a$ are time division multiplexed as shown in FIG. 6, and a transmission signal is transmitted. In this figure, F1 is the first reference channel, F2 is the second reference channel, M is an arbitrary channel, $F1_k$ is k-th bit of the reference channel F1 and $M_k$ is k-th bit of the channel M. In addition, in case of time division multiplexing, $M_k$ always locates M time slots behind from the $F1_k$.

In the data receiver B, the optical receiver 6 converts the transmission signal to electric information.

At this time, in other words, when the data receiver B starts up, the synchronization signal phase control circuit 12 outputs a control signal to shift phase of the synchronization signal one time slot by one time slot to the synchronization signal phase changing circuit 9 and changes the phase of the synchronization signal.

Then, the reference channel detection circuit 11 and the reference channel detection circuit 51 monitors data of each channel extracted in the data extraction circuit 10, detects the reference channel by finding out a unique signal string of discrimination information and outputs a detection signal to the synchronization signal phase control circuit 12.

Here, it is supposed that the reference channel detection circuit 11 has detected the reference channel F1 earlier than the reference channel detection circuit 51.

Then, the synchronization signal phase control circuit 12 stores the phase synchronized with the reference channel F1 as shown in FIG. 6, fixes the phase of the synchronization signal output from the synchronization signal phase changing circuit 9 on the reference phase.

Continuously, the synchronization signal phase control circuit 12 is requested to select an arbitrary channel, for example, channel M.

Here, the synchronization signal phase control circuit 12 calculates a time difference between the reference channel F1 and the channel M, in other words, it counts number of time slots from the reference channel F1 to the channel M.

Considering the case shown in FIG. 6, the number of time slots from the reference channel F1 to the channel M is M. Therefore, the synchronization signal phase control circuit 12 outputs a control signal to shift the reference phase M time slots to the synchronization signal phase changing circuit 9 as shown in FIG. 2.

Next, the synchronization signal phase changing circuit 9 shifts the phase of the synchronization signal (reference phase) M time slots, and outputs a synchronization signal synchronized with the channel M to the data extraction circuit 10.

Finally, the data extraction circuit 10 extracts and outputs data of the channel M from the electric information based on the synchronization signal synchronized with the channel M.

By the above operation, the reference channel can be detected rapidly even if number of the channels to be transmitted becomes large.

Next, the fifth embodiment is explained.

Figure 7:
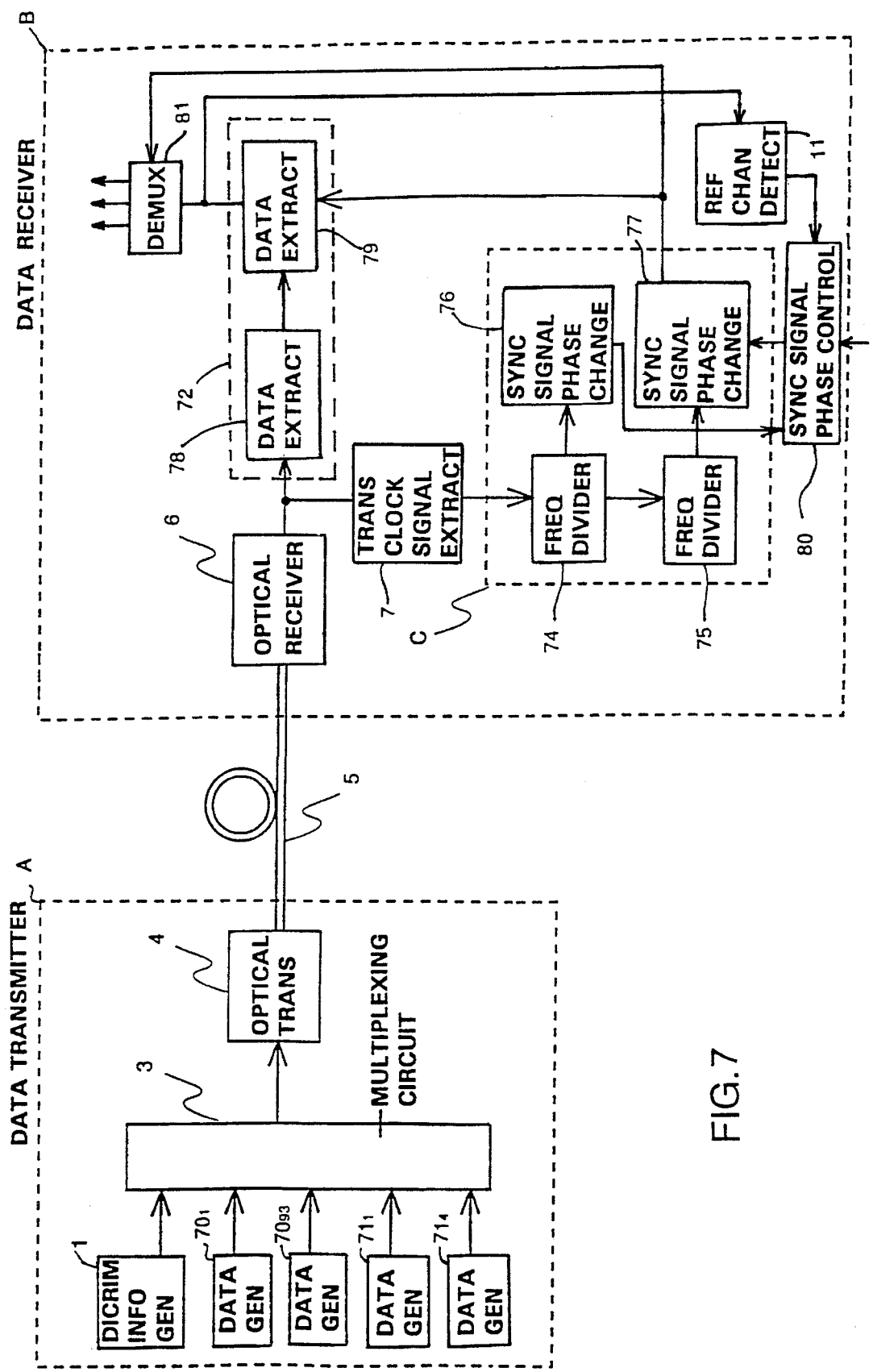
FIG. 7 is a block diagram of the fifth embodiment of the present invention.

FIG. 7 is a block diagram of the fifth embodiment. In FIG. 7, the component configured same as that of the first embodiment is given the same code number.

The fifth embodiment is a case having plural types of data transmission speed.

Using concrete figures, the fifth embodiment is explained.

In the data transmitter A, the reference channel generator 1 generates a digital signal, 101010 . . . , of 150 Mb/s transmission speed.

93 NTSC coders $70_1$ to $70_{93}$ output compressed signals of 50 Mb/s transmission speed.

4 HDTV coders $71_1$ to $71_4$ output compressed signals of transmission speed 1.25 Gb/s. These signals are input to the time division multiplexing circuit 3, multiplexed in each bit and in turn to transmission speed 10 Gb/s and transmitted by the optical transmitter 4 as light information.

In the data receiver B, the optical receiver 6 converts the light information transmitted through the optical fiber 5 to electric information. The electric information is branched into two. One of the branched signal is input to the data extraction means 72, another is input to the transmission clock signal extraction circuit 7 and becomes 10 GHz transmission clock signal.

The transmission clock signal of 10 GHz is input to the first frequency divider 74.

Then, it is frequency divided into ⅛ by the first frequency divider 74 to be a synchronization signal of 1.25 GHz. Further, it is frequency divided into ⅛ by the second frequency divider 75 to be a synchronization signal equivalent to 150 MHz.

Output of the first frequency divider 74 is input to the first synchronization signal phase changing circuit 76 and its phase is changed by the synchronization signal phase control circuit 80. Where, the temporal quantity of change of phase is equivalent to ⅛ of 10 GHz in each one step.

Output of the second frequency divider 75 is input to the second synchronization signal phase changing circuit 77 and its phase is changed by the synchronization signal phase control circuit 80. Where, the temporal quantity of change of phase is equivalent to 1/64 of 10 GHz in each one step.

Next, each synchronization signal is input to the first and second data extraction circuits 78 and 79 in the data extraction means 72. By decreasing or increasing the number of steps of phases, the channel of which data must be extracted can be selected.

Figure 8:
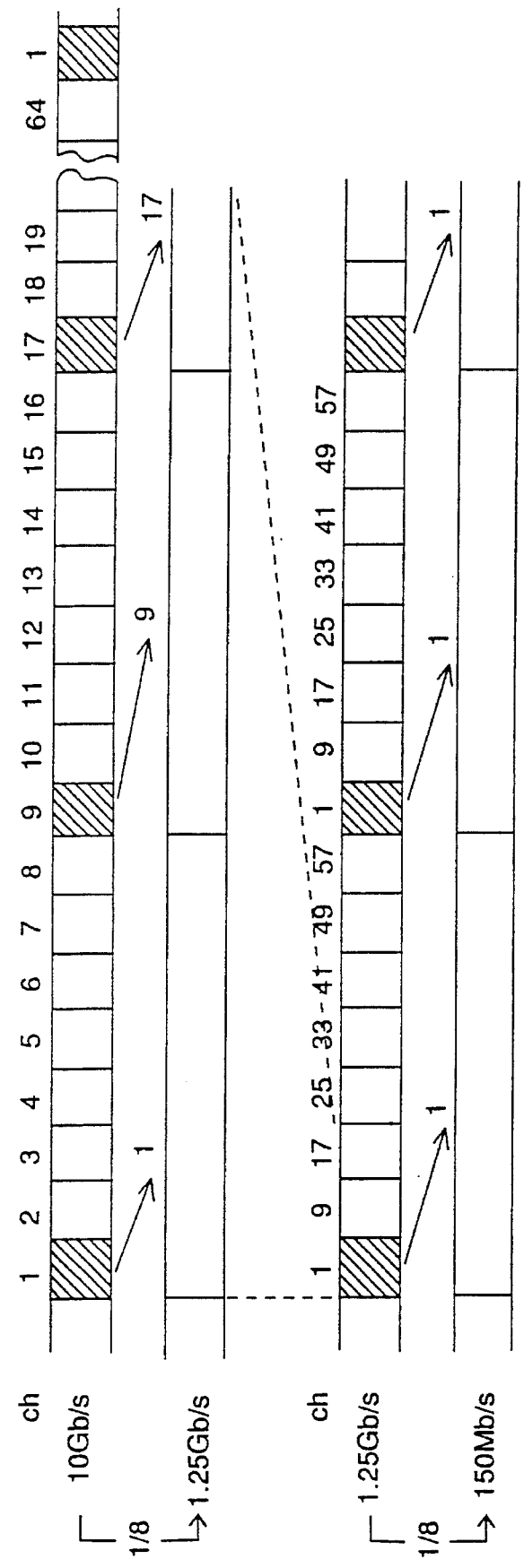
FIG. 8 is a timing chart of the fifth embodiment of the present invention.

Further explaining, as shown in FIG. 8, the first data extraction circuit 78 inputs data of 10 Gb/s transmission speed and outputs 1.25 Gb/s transmission speed data according to the output of the first synchronization signal phase changing circuit 76. Therefore, the HDTV compressed signal can be obtained by the first data extraction circuit 78.

Continuously, as shown in FIG. 8, the second data extraction circuit 79 inputs the 1.25 Gb/s transmission speed data output from the first data extraction circuit 78 and outputs 150 Mb/s transmission speed data according to the output of the second synchronization signal phase changing circuit 77. Therefore, the NTSC compressed signal can be obtained by inputting a signal from the second data extraction circuit 79 to 1:3 DEMUX circuit 81, extracting three 50 Mb/s signals in the 1:3 DEMUX circuit 81 and extracting only NTSC compressed signal selected from the three signals.

Next, a concrete operation is explained.

First of all, a reference channel is detected when the data receiver B start up.

For detecting this reference channel, the 10 Gb/s transmission speed data is input to the first data extraction circuit 78, then 1.25 Gb/s transmission speed data is output according to the output the first synchronization signal phase changing circuit 76.

The second synchronization signal phase changing circuit 77 outputs a 150 MHz synchronization signal while shifting phase of the 150 MHz synchronization signal every one time slot, totally 8 time slots, according to the synchronization signal phase control circuit 80.

The second data extraction circuit 79 received the 1.25 Gb/s transmission data outputs 150 Mb/s transmission data according to a synchronization signal from the second synchronization signal phase changing circuit 77.

Figure 9B:
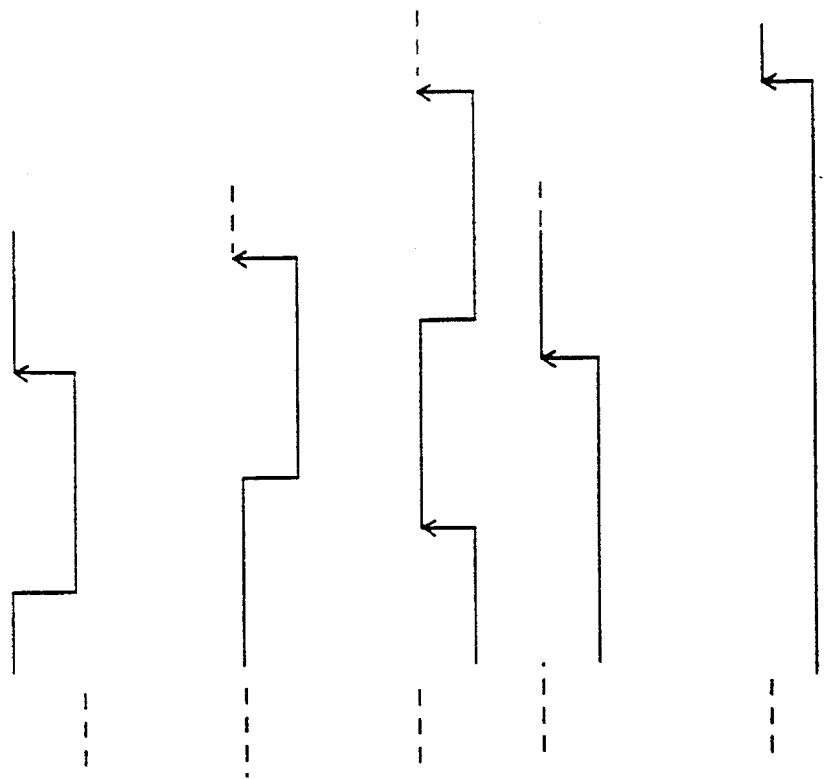
FIG. 9 is a timing chart of the fifth embodiment of the present invention.
Figure 10:
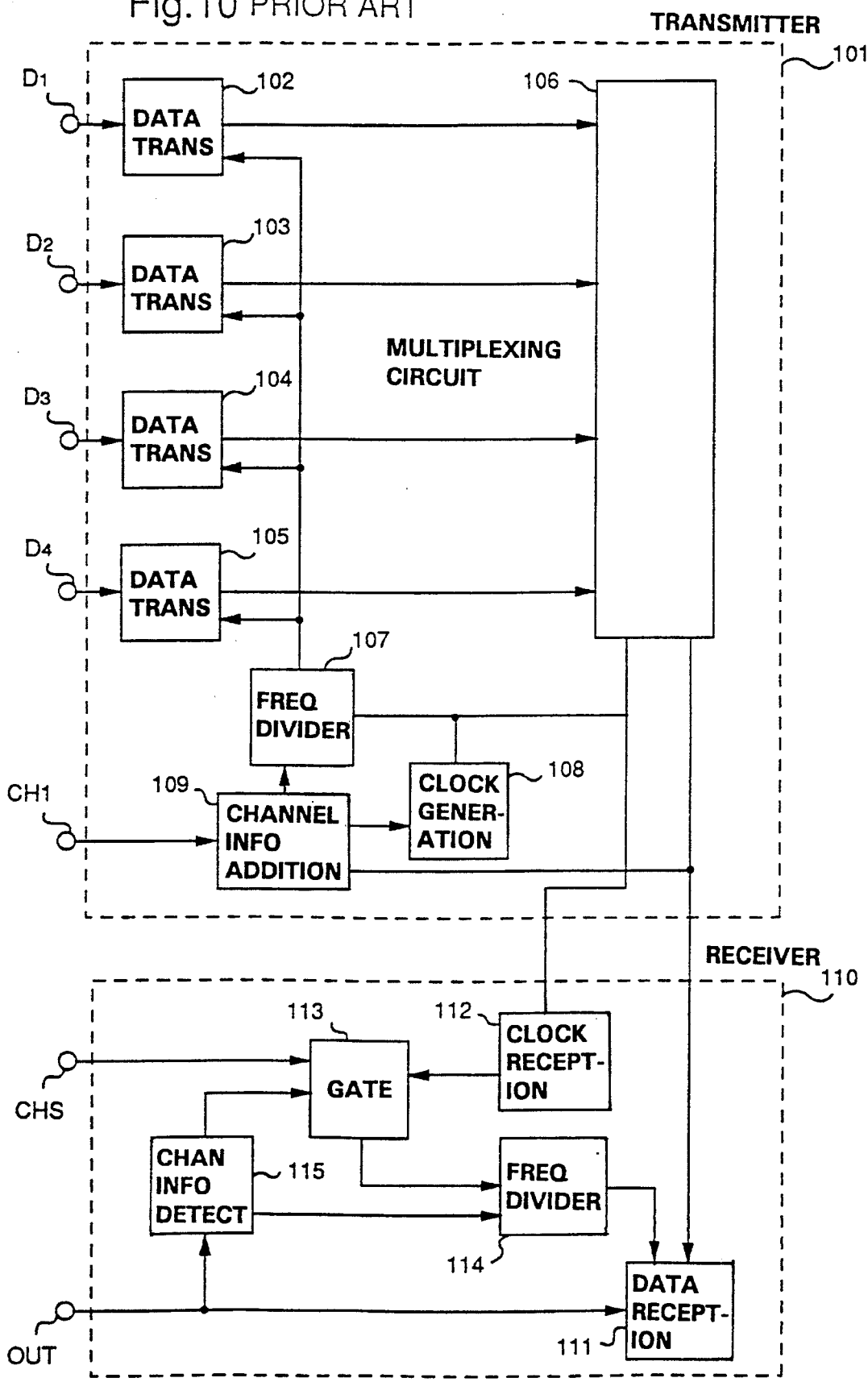
FIG. 10 is a figure for explaining a prior art.
Figure 11:
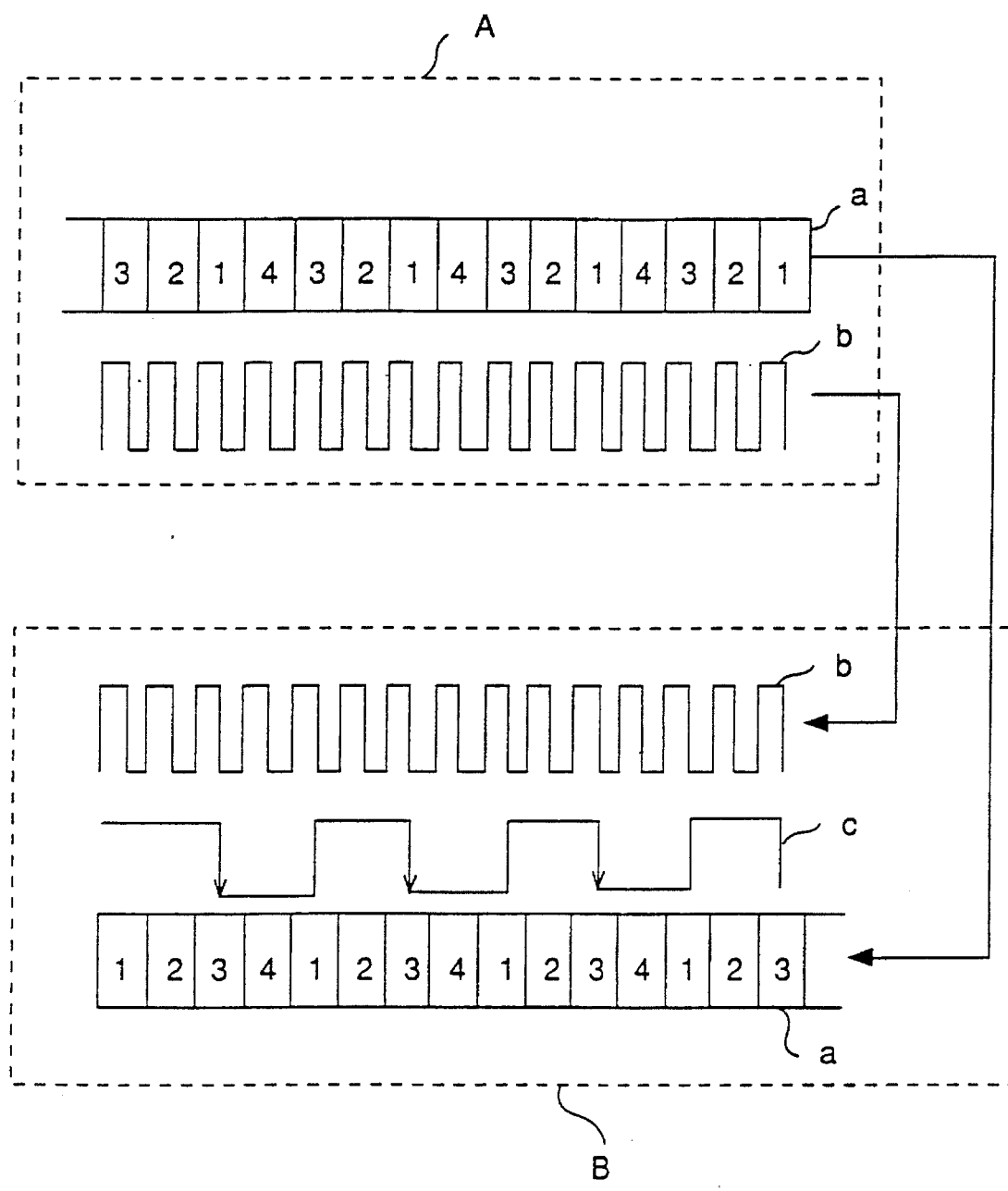
FIG. 11 is a figure for explaining a prior art.

Then, the 150 Mb/s transmission data is input to the reference channel detection circuit 11 and 8 channels are monitored from among the 64 channels shown in FIG. 9 by the reference channel detection circuit 11.

Next, the synchronization signal phase control circuit 80 instructs the first synchronization signal phase changing circuit 76 so as to output the 1.25 GHz synchronization signal, as shifting its phase every one time slot. The first data extraction circuit 78 outputs 1.25 Gb/s transmission speed data according to the output of the first synchronization signal phase changing circuit 76.

The second synchronization signal phase changing circuit 77 outputs the 150 MHz synchronization signal, as shifting its phase every one time slot, totally 8 time slots, according to instruction of the synchronization signal phase control circuit 80.

The second data extraction circuit 79 received the 1.25 Gb/s transmission speed data outputs 150 Mb/s transmission speed data according to the synchronization signal from the second synchronization signal phase changing circuit 77.

By the above operation, the reference channel detection circuit 11 received the 150 Mb/s transmission speed data monitors the different 8 channels from the latest detected 8 channels.

Like this, until having obtained a code string such as 101010 . . . , the reference channel detection circuit 11 continues the above operation to detect the reference channel.

When the reference channel is detected, the second synchronization signal phase changing circuits 76 and 77 adjust phase of each synchronization signal to the reference channel as shown in FIG. 8. In other words, the phase of the synchronization signal of 1.25 GHz and the phase of the synchronization signal of 150 MHz are fixed on the phase selecting bit of the reference channel.

Here, the case of selecting channel 2 of HDTV is considered.

First, when request to select channel 2 of HDTV is input to the synchronization signal phase control circuit 80, the synchronization signal phase control circuit 80 counts number of time slots from the reference channel to channel 2 of HDTV. In this case, the number of time slots is two as shown in FIG. 9.

Next, the synchronization signal phase control circuit 80 outputs a control signal to shift the phase of the synchronization signal of 1.25 GHz of which phase is fixed on the reference channel as shown in FIG. 9 two time slots to the first synchronization signal phase changing circuit 76.

The first synchronization signal phase changing circuit 76 shifts phase of the synchronization signal of 1.25 GHz two time slots.

By this operation, the synchronization signal of 1.25 GHz synchronizes with channel 2 of HDTV and data of channel 2 of HDTV is extracted from the first data extraction circuit 78.

Next, a case that a request to select NTSC channel 32 is input to the synchronization signal phase control circuit 80 is considered.

First, the synchronization signal phase control circuit 80, as shown in FIG. 9, outputs an instruction to the first synchronization signal phase changing circuit 76 to shift phase of the 1.25 GHz synchronization signal 5 time slots from the reference channel so as to extract data of 24 channels including the NTSC channel 32.

By this operation, the first synchronization signal phase changing circuit 76 shifts phase of the 1.25 GHz synchronization signal 5 time slots from the reference channel and outputs a result to the first data extraction circuit 78.

Then, data of 24 channels including the NTSC channel 32 of 1.25 Gb/s transmission speed are extracted by the first data extraction circuit 78.

Continuously, the synchronization signal phase control circuit 80, as shown in FIG. 9, outputs an instruction to the second synchronization signal phase changing circuit 77 to shift phase of the 150 MHz synchronization signal 5 time slots from the reference channel so as to extract data of NTSC channels 1, 32 and 63 from the 1.25 Gb/s transmission speed data output from the first data extraction circuit 78.

By this operation, the second synchronization signal phase changing circuit 77 shifts phase of the 150 MHz synchronization signal 5 time slots from the reference channel and outputs a result to the second data extraction circuit 79.

Then, the second data extraction circuit 79 extracts data of NTSC channels 1, 32 and 63 from the 1.25 Gb/s transmission speed data.

Next, these data are input to a 1:3 DEMUX circuit 81 and decimated, thus only data of NTSC channel 32 is extracted.

Receiver sensitivity by the present invention as optical receiver is −25 dBm. Its performance is practically equivalent to a prior optical receiver.

It is to be noted that the 1:3 DEMUX circuit 81 is used in this embodiment for extracting NTSC data, however, it is possible to use a frequency divider generating 50 MHz synchronization signal and a synchronization signal phase control circuit controlling 50 MHz synchronization signal instead of the 1:3 DEMUX circuit 81.

What is claimed is:

1. A method for channel selection among a plurality of channels, wherein at least one of said plurality of channels is a reference channel and at least one of said plurality of channels is a data channel, said reference channel including discrimination information which distinguishes said reference channel from said data channel, said method comprising the steps of:

(a) generating a transmission signal by time division multiplexing bit by bit said plurality of channels and transmitting said transmission signal;

(b) detecting from said transmitted transmission signal, a temporal location of said reference channel based on said discrimination information; and selecting an arbitrary channel based on a relative time difference between said temporal location of said reference channel and a temporal location of said arbitrary channel;

generating a synchronization signal according to a transmission speed of said data channel, wherein said synchronization signal includes a phase with respect to said reference channel;

changing said phase of said synchronization signal to a reference phase synchronized with said reference channel; and shifting said reference phase a number of time slots corresponding to said relative time difference to change said reference phase of said synchronization signal to a phase synchronized with said arbitrary channel.

2. A method for channel selection among a plurality of channels, wherein at least one of said plurality of channels is a reference channel and at least one of said plurality of channels is a data channel, said reference channel including discrimination information which distinguishes said reference channel from said data channel, said method comprising the steps of:

(a) generating a transmission signal by time division multiplexing bit by bit said plurality of channels and transmitting said transmission signal;

(b) detecting from said transmitted transmission signal, a temporal location of said reference channel based on said discrimination information; and selecting an arbitrary channel based on a relative time difference between said temporal location of said reference channel and a temporal location of said arbitrary channel;

wherein said plurality of channels each corresponds to one of a plurality of data transmission speeds, and said step (b) further comprises:

generating a plurality of synchronization signals each in accordance with said corresponding one of said plurality of data transmission speeds, wherein each of said synchronization signals includes a phase with respect to said reference channel;

decoding said discrimination information from said transmission signal by changing the phase of at least one of said synchronization signals and thereby detecting said reference channel;

adjusting the phase of said synchronization signals to said reference channel and setting these synchronization signals as reference synchronization signals; and selecting an arbitrary channel, when having received a request of selecting an arbitrary channel, by selecting a reference synchronization signal according to said arbitrary channel data transmission speed among said reference synchronization signals, counting number of time slots from said reference channel to said arbitrary channel, shifting the phase of said selected reference synchronization signal said number of the time slots and synchronizing said selected reference synchronization signal with said arbitrary channel.

3. A data receiver for receiving a transmission signal generated by time division multiplexing N channels, wherein at least one of said channels is a reference channel and wherein said reference channel includes discrimination information to distinguish said reference channel from non-reference channels, said data receiver comprising:

a means for extracting a transmission clock signal from said transmission signal;

a means for identifying said reference channel from said transmission signal based on said discrimination information;

a means for generating a synchronization signal in accordance with a data transmission speed of said transmission signal, said synchronization signal having a phase with respect to the reference channel, and wherein said means for identifying said reference channel is controlled by the phase of said synchronization signal, and wherein the phase of said synchronization signal is stored as a reference phase when said means for identifying said reference channel has detected said reference channel, and wherein upon a request for a selection of an arbitrary channel, the phase of said synchronization signal is synchronized with said arbitrary channel by counting a number of time slots from said reference channel to said arbitrary channel, and shifting said reference phase said number of the time slots; and a means for extracting data on said arbitrary channel from said transmission signal based on said synchronization signal.

4. The data receiver of claim 3, wherein said means for generating a synchronization signal comprises:

a frequency divider for generating said synchronization signal by dividing said transmission clock signal into 1/N;

a phase changing circuit for changing the phase of said synchronization signal based on a control signal and synchronizing the phase of said synchronization signal with an arbitrary channel; and a phase control circuit for directing said means for identifying said reference channel to detect said reference channel by outputting said control signal to change the phase of said synchronization signal, and wherein the phase of said synchronization signal is stored as a reference phase when said means for identifying said reference channel has detected said reference channel, and wherein upon a request for a selection of an arbitrary channel, the phase of said synchronization signal is synchronized with said arbitrary channel by counting a number of time slots from said reference channel to said arbitrary channel and outputting said control signal to shift said reference phase said number of the time slots.

5. The data receiver of claim 3, wherein said means for generating a synchronization signal comprises:

a frequency divider for generating said synchronization signal by frequency dividing said transmission clock signal into 1/N; and a phase control circuit for changing the phase of said synchronization signal by resetting said frequency divider, and directing said means for identifying said reference channel to detect said reference channel, and wherein the phase of said synchronization signal is stored as a reference phase when said means for identifying said reference channel has detected said reference channel, and wherein upon a request for a selection of an arbitrary channel, a number of time slots from said reference channel to said arbitrary channel is counted and said frequency divider is reset so as to delay said reference phase said number of time slots.

6. The data receiver of claim 3, wherein said means for generating a synchronization signal comprises:

a variable frequency divider and a phase control circuit;

said variable frequency divider having frequency division modes, 1/N and 1/(N+1), for generating said synchronization signal by frequency dividing said transmission clock signal in a frequency division mode, wherein said frequency division mode is 1/(N+1) if an instruction is received from said phase control circuit to change the mode to 1/(N+1) for a specified number of cycles and otherwise said frequency division mode is 1/N; and said phase control circuit changing the phase of said synchronization signal by outputting an instruction to said variable frequency divider to change the frequency mode to 1/(N+1) for a specified number of cycles, and directing said means for identifying said reference channel to detect said reference channel, and wherein the phase of said synchronization signal is stored as a reference phase when said means for identifying said reference channel has detected said reference channel, and wherein upon a request for a selection of an arbitrary channel, a number of time slots from said reference channel to said arbitrary channel is counted and, outputting said number of time slots as said number of cycles to said variable frequency divider.

7. The data receiver of claim 3, for receiving a transmission signal having a plurality of reference channels, wherein:

a corresponding plurality of said means for identifying said reference channels are provided, and wherein each of said means for identifying detects a respective reference channel; and said means for generating a synchronization signal stores the phase of the synchronization signal when the first reference channel is detected by said plurality of said means for identifying said reference channels as said reference phase.

8. The data receiver of claim 3, wherein said plurality of channels each corresponds to one of a plurality of data transmission speeds and wherein at least one of said data transmission speeds differs from at least one other of said data transmission speeds, comprising:

a second means for generating a second synchronization signal according to an arbitrary data transmission speed based on said transmission clock signal, wherein the phase of said second synchronization signal is synchronized to the phase of said reference channel that has been detected by said means for identifying said reference channel, and wherein upon a request of selection of a channel according to said second synchronization signal, a number of time slots from said reference channel to the channel requested to be selected is counted, and wherein the phase of said second synchronization signal synchronized to said reference channel is shifted said number of the time slots to synchronize said second synchronization signal with said channel requested to be selected; and a second means for extracting data of said channel requested to be selected from said transmission signal based on said second synchronization signal that is phase synchronized with said requested channel.

9. A data receiver for receiving a transmission signal that has a data transmission speed and is generated by time division multiplexing a plurality of channels, wherein said plurality of channels includes at least one reference channel and wherein said reference channel includes discrimination information and wherein at least said reference channel has a transmission speed different than the transmission speed of the other of said plurality of channels, said data receiver comprising:

a means for extracting a transmission clock signal from said transmission signal;

a means for detecting said reference channel from said transmission signal based on said discrimination information;

a means for generating a first synchronization signal in accordance with a data transmission speed of said reference channel and for generating a second synchronization signal according to a data transmission speed of other channels, wherein said means for detecting said reference channel detects said reference channel by controlling the phase of said first synchronization signal, and wherein the phase of said second synchronization signal is adjusted to the detected reference channel, and wherein upon a request of selection of an arbitrary channel, said second synchronization signal is selected according to a data transmission speed of said arbitrary channel, and wherein a number of time slots from said reference channel to said arbitrary channel is counted, and the phase of said second synchronization signal adjusted to said reference channel is shifted said number of the time slots to synchronize said second synchronization signal with said arbitrary channel; and a means for extracting data of said arbitrary channel from said transmission signal based on said second synchronization signal.

10. The data receiver of claim 9, wherein said means for generating said first and second synchronization signals comprises:

a plurality of frequency dividers, said frequency dividers generating respectively, by frequency dividing said data transmission speed of said transmission signal, said first and second synchronization signals;

a plurality of phase changing circuits, each of said phase changing circuits for adjusting the phase of said synchronization signals, the phase of said second synchronization signal being adjusted to said arbitrary channel by changing the phase of said second synchronization signal based on a control signal; and a plurality of phase control circuits, each of said phase control circuits for changing the phase of said synchronization signals by outputting said control signal, wherein the phase of said second synchronization signal is adjusted to the phase of said reference channel, and wherein upon a request for selection of said arbitrary channel, a number of time slots from said reference channel to said arbitrary channel is counted and said control signal is output to shift the phase of said second synchronization signal said number of the time slots.

11. A data transmitter and receiver comprising:

(a) a data transmission means including:
(1) a discrimination information generation means for generating discrimination information to discriminate a reference channel;
(2) a time division multiplexing means for generating transmission data by time division multiplexing said discrimination information and data of other channels, the total number of channels being equal to N;

(b) a data reception means including:
(1) a transmission clock signal extraction means for extracting a transmission clock signal from said transmission signal;
(2) a reference channel detection means for detecting said reference channel from said transmission signal based on said discrimination information;
(3) a synchronization signal phase control means for generating a synchronization signal according to a data transmission speed based on said transmission clock signal, wherein said reference channel detection means is controlled by the phase of said synchronization signal, and wherein the phase of the synchronization signal is stored as a reference phase when said reference channel detection means has detected said reference channel, and wherein upon a request for a selection of an arbitrary channel, a number of time slots from said reference channel to said arbitrary channel is counted, and said reference phase is shifted said number of the time slots to synchronize the phase of said synchronization signal with said arbitrary channel; and
(4) a data extraction means for extracting data of said arbitrary channel based on said synchronization signal that is phase synchronized with said arbitrary channel.

12. The data transmitter and receiver of claim 11, wherein said synchronization signal phase control means comprises:

a frequency divider for generating said synchronization signal by frequency dividing said transmission clock signal into 1/N;

a phase changing circuit for synchronizing the phase of said synchronization signal to an arbitrary channel by changing the phase of said synchronization signal based on a control signal;

a phase control circuit for directing said reference channel detection means to detect said reference channel by outputting said control signal to change the phase of said synchronization signal, and wherein the phase of said synchronization signal is stored as a reference phase when said reference channel detection means has detected said reference channel, and wherein upon a request for a selection of an arbitrary channel, a number of time slots from said reference channel to said arbitrary channel is counted, and said control signal is output to shift said reference phase said number of the time slots.

13. The data transmitter and receiver of claim 11, wherein said synchronization signal phase control means comprises:

a frequency divider for generating said synchronization signal by frequency dividing said transmission clock signal into 1/N;

a phase control circuit for changing the phase of said synchronization signal by resetting said frequency divider, and directing said reference channel detection means to detect said reference channel, and wherein the phase of said synchronization signal is stored as a reference phase when said reference channel detection means has detected said reference channel, and wherein upon a request for a selection of an arbitrary channel, a number of time slots from said reference channel to said arbitrary channel is counted and said frequency divider is reset so as to delay said reference phase said number of time slots.

14. The data transmitter and receiver of claim 11, wherein said synchronization signal phase control means comprises:

a variable frequency divider and a phase control circuit;

said variable frequency divider having frequency division modes, 1/N and 1/(N+1), for generating synchronization signal by frequency dividing said transmission clock signal in a frequency division mode, wherein said frequency division mode is 1/(N+1) if an instruction is received from said phase control circuit to change the mode to 1/(N+1) for a specified number of cycles and otherwise said frequency division mode is 1/N; and said phase control circuit changing the phase of said synchronization signal by outputting an instruction to said variable frequency divider to change the frequency mode to 1/(N+1) for a specified number of cycles, and directing said reference channel detection means to detect said reference channel, and wherein the phase of said synchronization signal is stored as a reference phase when said reference channel detection means has detected said reference channel, and wherein upon a request for a selection of an arbitrary channel, a number of time slots from said reference channel to said arbitrary channel is counted and, outputting said number of time slots as said number of cycles to said variable frequency divider.

15. The data transmitter and receiver of claim 11, for receiving a transmission signal having a plurality of reference channels, wherein:

a corresponding plurality of reference channel detection means are provided, wherein each of said reference channel detection means detects respective reference channel; and said synchronization signal phase control means stores the phase of the synchronization signal when the first reference channel is detected by said plurality of reference channel detection means as said reference phase.

16. A data receiver for receiving a transmission signal that has a data transmission speed and is generated by time division multiplexing a plurality of channels, wherein said plurality of channels includes at least one reference channel, and wherein said reference channel includes discrimination information and wherein at least said reference channel has a transmission speed different than the transmission speed of the other of said plurality of channels, said data receiver comprising:

a transmission clock signal extraction means for extracting a transmission clock signal from said transmission signal;

a reference channel detection means for detecting said reference channel from said transmission signal based on said discrimination information;

a synchronization signal phase control means for generating a plurality of synchronization signals in accordance with data transmission speeds of said channels which are based on said transmission clock signal, wherein said reference channel detection means detects said reference channel by controlling the combination of the phases of said synchronization signals, and wherein the phases of said synchronization signals are adjusted to the phase of the detected reference channel, and wherein upon a request for a selection of an arbitrary channel, a number of time slots from said reference channel to said arbitrary channel is counted, and the phases of said synchronization signals adjusted to said reference channel are adjusted said number of the time slots to synchronize said combination of phases of said synchronization signals with said arbitrary channel; and a data extraction means for extracting data of said arbitrary channel from said transmission signal based on said synchronization signals that are phase synchronized with said arbitrary channel.

17. The data receiver of claim 16, wherein said synchronization signal phase control means comprises:

a plurality of frequency dividers, said frequency dividers generating respectively, by frequency dividing the data transmission speed of said transmission signal, said synchronization signals;

a plurality of phase changing circuits, each of said phase changing circuits for adjusting the phase of a respective synchronization signal to said arbitrary channel by changing the phase of said respective synchronization signal based on a control signal; and a phase control circuit for changing the phases of said synchronization signals by outputting said control signals, wherein the phases of said synchronization signals is adjusted to the phase of said reference channel, and wherein upon a request of selection of said arbitrary channel, a number of time slots from said reference channel to said arbitrary channel is counted and said control signals is output to shift the phases of said synchronization signals said number of the time slots.

* * * * *